(12) United States Patent
Freund

(10) Patent No.: US 10,954,811 B2
(45) Date of Patent: Mar. 23, 2021

(54) MEASURING DEVICE AND MEASURING METHOD FOR A FLOW

(71) Applicant: Rolls-Royce Deutschland Ltd & Co KG, Blankenfelde-Mahlow (DE)

(72) Inventor: Oliver Freund, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 185 days.

(21) Appl. No.: 15/935,877

(22) Filed: Mar. 26, 2018

(65) Prior Publication Data

US 2018/0283202 A1 Oct. 4, 2018

(30) Foreign Application Priority Data

Mar. 31, 2017 (DE) ...................... 10 2017 205 573.1

(51) Int. Cl.
| | |
|---|---|
| G01M 15/14 | (2006.01) |
| F01D 21/00 | (2006.01) |
| G01L 19/00 | (2006.01) |
| F01D 17/08 | (2006.01) |
| G01M 3/26 | (2006.01) |
| G01F 1/46 | (2006.01) |

(52) U.S. Cl.
CPC ........... *F01D 21/003* (2013.01); *F01D 17/08* (2013.01); *G01F 1/46* (2013.01); *G01L 19/00* (2013.01); *G01M 3/26* (2013.01); *G01M 15/14* (2013.01); *F05D 2220/323* (2013.01); *F05D 2220/40* (2013.01); *F05D 2270/301* (2013.01); *F05D 2270/303* (2013.01); *F05D 2270/306* (2013.01); *F05D 2270/311* (2013.01)

(58) Field of Classification Search
CPC ............................... G01L 19/00; G01M 15/14
USPC ........................................................ 73/112.01
See application file for complete search history.

(56) References Cited

U.S. PATENT DOCUMENTS

| | | | |
|---|---|---|---|
| 3,928,161 A | 12/1975 | McIntyre et al. | |
| 4,733,975 A | 3/1988 | Komanetsky et al. | |
| 4,903,481 A | 2/1990 | Schuster et al. | |
| 5,157,914 A | 10/1992 | Schwarz et al. | |
| 5,616,870 A * | 4/1997 | Bowen ................. | G01N 1/2247 73/112.01 |

(Continued)

FOREIGN PATENT DOCUMENTS

| | | |
|---|---|---|
| DE | 3323241 A1 | 1/1985 |
| DE | 102008007317 A1 | 8/2009 |

(Continued)

OTHER PUBLICATIONS

German Search Report dated Oct. 16, 2017 for counterpart German Application No. DE 10 2017 205 573.1.

(Continued)

*Primary Examiner* — Eric S. McCall
(74) *Attorney, Agent, or Firm* — Shuttleworth & Ingersoll, PLC; Timothy Klima

(57) ABSTRACT

A measuring device, in particular for a flow inside a turbomachine, in particular in an aircraft engine. The measuring device includes at least one suction intake opening for fluid from an area of a mixed-out flow, wherein the at least one suction intake opening is arranged at a distance from a wall that delimits the flow, and fluid that is suctioned in through a fluid channel can be conducted to a sensor device.

18 Claims, 6 Drawing Sheets

(56) References Cited

U.S. PATENT DOCUMENTS

| | | | |
|---|---|---|---|
| 6,230,103 B1* | 5/2001 | DeCorso | G01N 33/004 60/39.27 |
| 8,966,956 B2* | 3/2015 | Yoshioka | G01N 15/0606 73/23.33 |
| 9,175,988 B2 | 11/2015 | Kieliger et al. | |
| 9,335,197 B2 | 5/2016 | Kundscher et al. | |
| 2002/0134083 A1* | 9/2002 | Staphanos | G05B 23/0294 60/698 |
| 2006/0140754 A1 | 6/2006 | Tanioka | |
| 2006/0288703 A1 | 12/2006 | Kurtz et al. | |
| 2007/0062275 A1* | 3/2007 | Beyrich | G01F 1/6842 73/204.21 |
| 2008/0060453 A1* | 3/2008 | Liu | G01N 33/0018 73/863 |
| 2008/0060456 A1* | 3/2008 | Liu | G01N 1/2252 73/863.31 |
| 2008/0060457 A1* | 3/2008 | Liu | G01N 1/2252 73/863.31 |
| 2013/0314076 A1 | 11/2013 | Schlereth et al. | |
| 2014/0037430 A1 | 2/2014 | Thorpe et al. | |
| 2014/0069187 A1 | 3/2014 | Ranftl et al. | |
| 2014/0133963 A1 | 5/2014 | Bird | |
| 2015/0082875 A1* | 3/2015 | Beyrich | F02M 35/10242 73/114.32 |
| 2015/0276441 A1* | 10/2015 | Kraige | G01F 1/46 73/861.42 |
| 2015/0354512 A1* | 12/2015 | Tsujii | G01F 1/6842 73/114.32 |
| 2016/0061638 A1* | 3/2016 | Schleif | G01D 11/245 73/866.5 |
| 2017/0184472 A1 | 6/2017 | Fechner et al. | |
| 2018/0023496 A1* | 1/2018 | Itakura | F02D 41/18 73/114.32 |
| 2018/0058951 A1* | 3/2018 | Zinn | G01K 13/02 |
| 2018/0120138 A1* | 5/2018 | Markov | G01F 1/6842 |
| 2020/0158550 A1* | 5/2020 | Yamaguchi | G01F 15/16 |

FOREIGN PATENT DOCUMENTS

| | | |
|---|---|---|
| DE | 102009010637 A1 | 1/2010 |
| DE | 102011101503 A1 | 11/2012 |
| DE | 102011089942 A1 | 6/2013 |
| DE | 102012103874 A1 | 11/2013 |
| DE | 102012104412 A1 | 11/2013 |
| DE | 102012216267 A1 | 3/2014 |
| DE | 202013005259 U1 | 9/2014 |
| DE | 102015226732 A1 | 6/2017 |
| EP | 0255056 A2 | 2/1988 |
| EP | 2853872 A1 | 4/2015 |
| GB | 2483931 A | 3/2012 |
| WO | 8101331 A1 | 5/1981 |
| WO | WO2012055795 A1 | 5/2012 |

OTHER PUBLICATIONS

European Search Report dated Sep. 28, 2018 for counterpart European Patent Application No. 18163384.3.

European Office Action dated Jun. 19, 2020 from counterpart European Application No. 18163384.3.

\* cited by examiner

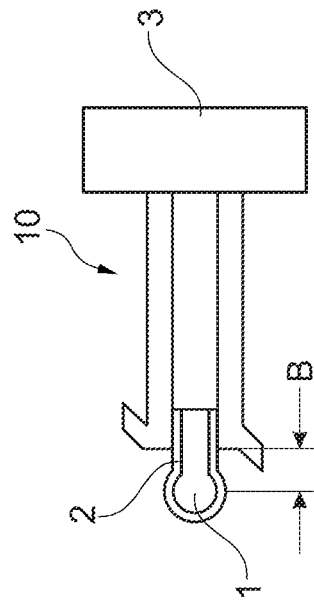
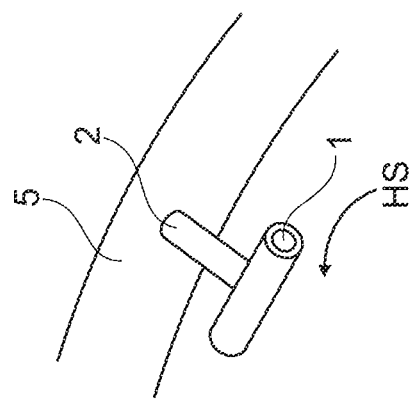
Fig. 3A
Fig. 3B
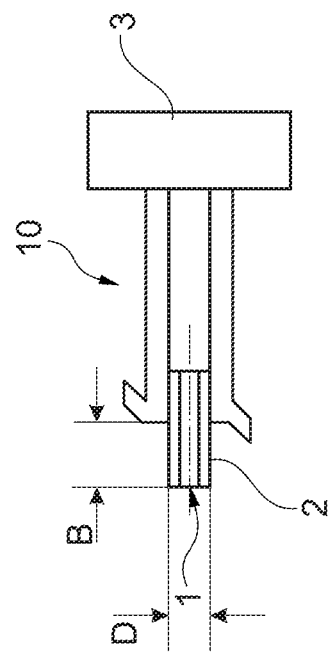
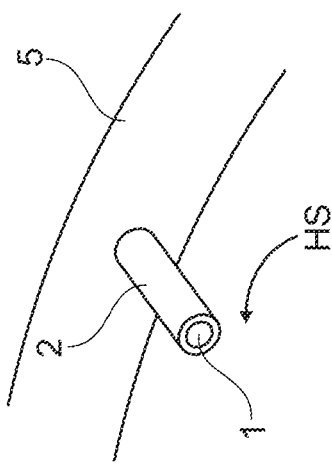
Fig. 4A
Fig. 4B

MEASURING DEVICE AND MEASURING METHOD FOR A FLOW

REFERENCE TO RELATED APPLICATION

This application claims priority to German Patent Application No. 10 2017 205 573.1, the entirety of which is incorporated by reference herein.

BACKGROUND

The invention relates to a measuring device for a flow and a measuring method for a flow.

One characteristic of flows involving friction is the formation of so-called boundary layers. Here, the boundary layer comprises the fluid that has a lower impulse as compared to the core flow and that occurs due to friction (e.g. against bodies inside the flow), but also as a result of rotational or centrifugal forces. In particular in rotation-induced boundary layers, what occurs as a result are circumferential variations with a very high amplitude that make a precise and low-fluctuation characterization of the cavity flow more difficult or impossible.

Technical flows are versatile and in most cases very complex. Effects such as for example friction, rotational and Coriolis forces contribute to the flows exhibiting velocity, pressure and temperature gradients. Especially in turbomachines (e.g. an aircraft engine) in which high pressures and high rotational speeds occur, the flows comprise a complex three-dimensional structure. A typical case is the labyrinth seal between a guide vane and a rotor blade in an aircraft engine that is used for sealing cavities in the turbine. Here, an intact sealing is essential for limiting the thermal load that the turbine discs are exposed to. Therefore, the air temperature is often measured in this area for monitoring the sealing function of the labyrinth seal. However, due to boundary layer effects, different temperatures occur in the circumferential direction during operation, which makes it necessary to arrange a plurality of sensors.

In known flow measuring devices (e.g. in U.S. Pat. No. 5,157,914 A, US 2014/0133963 A1 or US 2014/0037430 A1), the fluid is suctioned from the flow in a manner flush with the wall, so that the measurements are impacted by boundary layer influences and thus a large circumferential variation has to be expected.

SUMMARY

Thus, it is desirable in many cases to characterize the mixed-out state of a fluid in a flow, i.e. to be able to perform a measurement that is not influenced by boundary layer effects.

The objective is achieved through a flow measuring device with features as described herein.

Here, at least one suction intake opening serves for the targeted suctioning-in of fluid from an area of a mixed-out flow, wherein the at least one suction intake opening is arranged at a distance from a wall that delimits the flow, and suctioned-in fluid can be conducted to a sensor device via a fluid channel. Here, the fluid channel is embodied in such a manner that the inflow of the suctioned-in mixed-out fluid is performed in an impoundment-free manner. Thus, the fluid channel can e.g. have a section through which the fluid easily flows, wherein fluid can then be diverted from this section to the sensor device. Or the suction intake opening is embodied so as to be substantially parallel to the main flow direction.

In this manner, it is possible to perform a consistent, very precise and low-fluctuation characterization of the core flow. In particular in boundary layers that occur due to rotation, boundary layer effects causing a circumferential variation with a large amplitude can thus be minimized.

Here, the at least one suction intake opening can be arranged at the fluid channel of the measuring device, wherein the fluid channel is formed in a straight or curved manner at least in certain areas. Also, in one embodiment, the cross section of the at least one suction intake opening can be embodied in a rounded or elliptical manner.

In one embodiment, at least one suction intake opening can be arranged at the circumference of the fluid channel. In a special embodiment, in particular two suction intake openings can then be arranged at a distance of between 90° and 120°.

For minimizing the influence of the boundary layer, the ratio between the free length of the fluid channel in the flow and the characteristic diameter of the fluid channel can be between 0.5 and 1.5, in particular 1.

It is also possible that the free length of the fluid channel inside the flow corresponds to 2 to 10 times the boundary layer thickness as it is formed during operation. In this manner, the boundary layer influences on the measurement results are to be minimized.

Depending on the flow conditions, the at least one suction intake opening can be arranged in parallel to a main flow direction or at an angle, in particular at an angle of between 70° and 110°, in particular between 85° and 105°, especially in particular at an angle of 90° with respect to the main flow direction.

In a further embodiment, the pressure difference between the mixed-out flow and the sensor device during operation is between 1.2 and 1.5, in particular 1.4. In this manner, a sufficient through-flow is ensured.

In one embodiment, the sensor device is embodied as a temperature sensor, as a sensor for measuring the concentration of at least one substance, as a sensor for determining the particle size of a flow containing particles, as a sensor for determining the air humidity, as a sensor for determining the oil content in a gas and/or a pressure sensor.

A typical measuring device of a mixed-out fluid is located between a guide vane and a rotor blade, at the leading edge of a wing, in a turbo charger or a wind turbine.

In one embodiment variant, the measuring device is configured and provided for particle measurements in the exhaust of diesel vehicles, for particle measurements for controlling the cleanness of laboratory facilities (cleanrooms), or for measuring oil and/or the concentrations of other substances in drinking water for securing the drinking water quality.

A turbomachine, in particular an aircraft engine, can also be equipped with at least one flow measuring device as described herein. In particular, the at least one measuring device can be arranged in an air conduction system and/or a hot gas path of the compressor and/or the turbine.

The objective is also achieved through a measuring method with features as described herein.

Such a measuring method can for example be used for particle measurements in the exhaust of diesel vehicles, for particle measurements for controlling the cleanness of laboratory facilities (cleanrooms), or for measuring oil and/or the concentrations of other substances in drinking water for ensuring the drinking water quality.

In an exemplary embodiment, the measuring method is provided for a flow in a turbomachine, in particular in an aircraft engine.

BRIEF DESCRIPTION OF THE DRAWINGS

The invention is explained in connection with the exemplary embodiments shown in the Figures.

FIG. 3A shows a sectional view of a further embodiment of the measuring device.

FIG. 3B shows a perspective rendering of the embodiment according to FIG. 3A.

FIG. 4A shows a sectional view of a further embodiment of the measuring device.

FIG. 4B shows a perspective rendering of the embodiment according to FIG. 4A.

DETAILED DESCRIPTION

Figure 1:
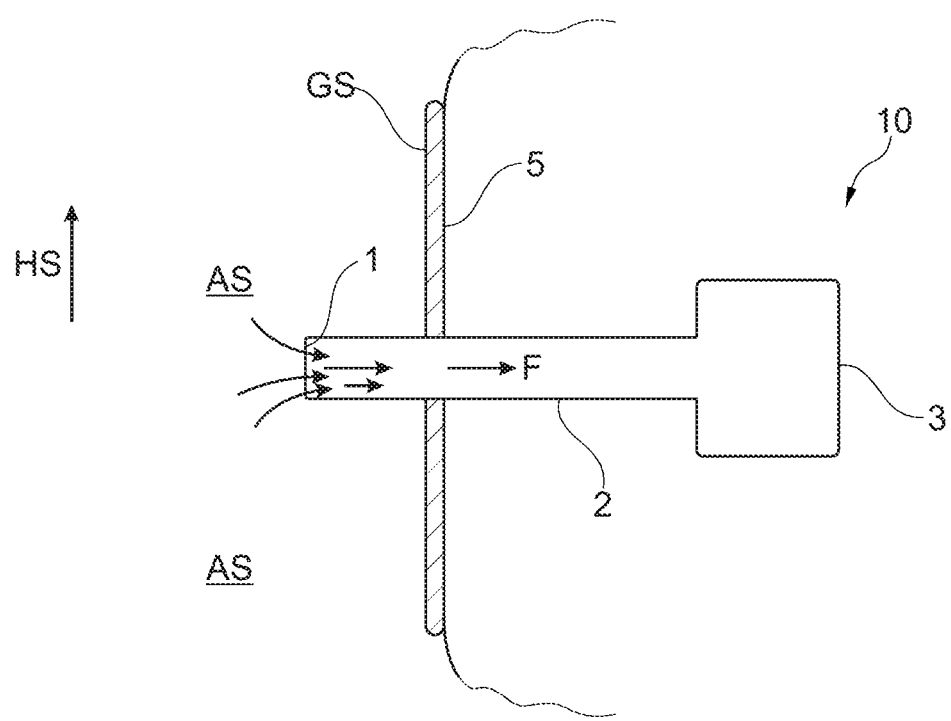
FIG. 1 shows a schematic drawing of an embodiment of a measuring device.

The characterization of the fluid in complex flows is relevant for understanding and improving modern turbomachines in many respects. FIG. 1 shows a measuring device 10 for a flow in a turbomachine, in particular in an aircraft engine, by means of which effects of a boundary layer GS on the measurement result can be minimized.

Here, the boundary layer GS is formed during operation directly at a wall 5. A typical boundary layer thickness of a flow in an aircraft engine is in the range of 0.5 mm.

An area of the mixed-out flow AS is formed in the core of the flow, with the main flow direction HS being indicated in FIG. 1.

In the embodiment shown herein, a suction intake opening 1 serves for suctioning-in fluid from the area of the mixed-out flow AS, wherein the at least one suction intake opening 1 is arranged at a distance from the wall 5 delimiting the flow, and fluid that is suctioned in through a fluid channel 2 is conducted—without any impoundment in the interior of the fluid channel 2—to a sensor device 3 (e.g. a temperature measuring device). What is meant by impoundment-free here is in particular that no stagnation pressure is measured in the fluid channel 2.

Thus, with the suction intake opening 1 at the tip, the fluid channel 2 projects into the flow as a kind of snorkel. Due to the distance of the suction intake opening 1 from the boundary layer GS, boundary layer effects are minimized during measurement. The ratio of the free length (i.e. the distance B of the suction intake opening 1 from the wall 5) of the fluid channel 2 in the flow and the characteristic diameter of the fluid channel 2 can be between 0.5 and 1.5, in particular 1. This free length can also be 2 to 10 times the boundary layer as it is formed during operation.

Figure 2:
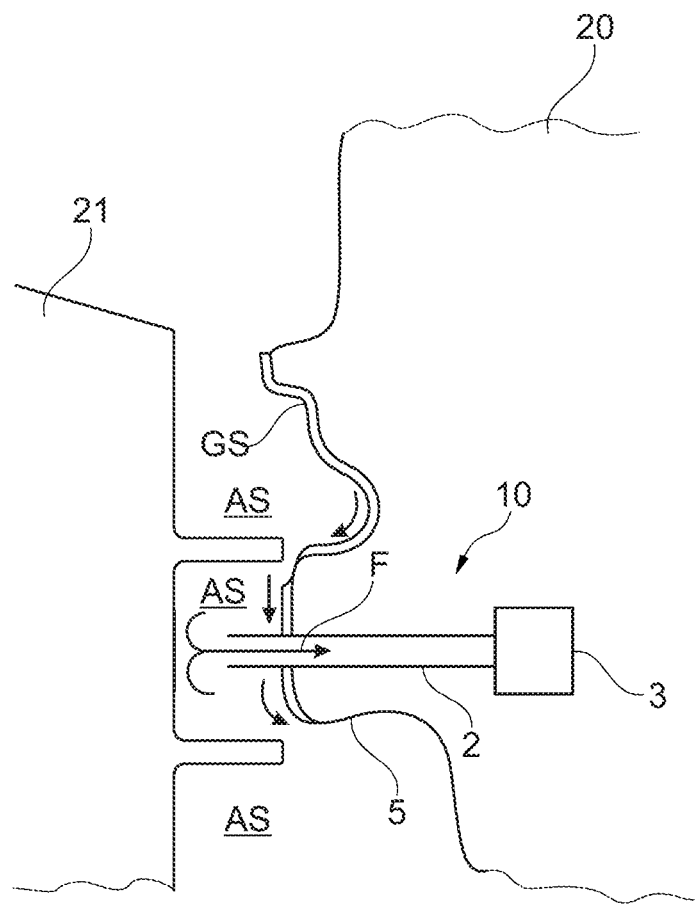
FIG. 2 shows a schematic sectional view of a further embodiment of the measuring device.

A concrete application example is the monitoring of the turbine cooling air temperature, that is schematically shown in FIG. 2. Here, the intermediate space between a guide vane 20 and a rotor blade 21 is shown, inside of which a flow AS has formed that is mixed-out in the central area of the intermediate space. At the guide vane 20, a boundary layer GS is formed at the wall 5 for the flow.

The current state of the art provides systems in which the entry channel ends flush with the wall and thus suctions off fluid from the metal surface of the walls that delimit the flow. As a result, the measurement of the fluid characteristics, such as for example the fluid temperature, is influenced by high grade three-dimensional boundary layer effects. This results in substantial disadvantages, such as for example a circumferential variation with a high amplitude. This is disadvantageous in particular in the case that the characterization of the flow is to be realized by suctioning off fluid at just a few positions that are distributed around the circumference. The high range of variation contributes to the need to have a high security factor available.

In order to achieve a reduction of this high circumferential variation, the fluid is suctioned off from the mixed-out flow AS in a manner that is not flush with the wall, but rather with a suction intake opening 1 at the tip of a fluid channel 2. In this manner, the fluid is suctioned off from the core area of the flow, the mixed-out flow AS, instead of from the boundary layer GS of the flow. The fluid channel 2—which in the present case is realized in the form of a small tube—projects into the core flow (mixed-out flow AS) and is offset in a defined manner from the metal surface of the wall 5 that delimits the fluid. FIGS. 3A, 3B shows the basic embodiment according to FIGS. 1 and 2 in a sectional view (FIG. 3A) and a perspective view (FIG. 3B), so that the description of FIGS. 1 and 2 may be referred to.

FIG. 3B shows that the fluid channel 2 projects with the suction intake opening 1 into the main flow HS with the mixed-out flow AS. What can also be seen in FIG. 3A is the distance B from the wall 5.

Here, the suction intake opening 1 is oriented in parallel to the main flow HS, i.e. at an angle of 0°.

In an alternative embodiment that is shown in FIGS. 4A, 4B, the suction intake opening 1 points in the direction of the main flow direction HS, i.e. an angle of 90° is present between the cross-sectional surface of A and the main flow direction HS. In alternative embodiments, the angle between the cross-sectional surface of the suction intake opening 1 and the main flow direction HS can also be between 0° and 90°. In the embodiment according to FIGS. 4A, 4B, the fluid channel 2 is formed in a substantially T-shaped manner, wherein fluid enters through the suction intake opening 1 and is discharged again at the opposite end. In the part of the fluid channel that is positioned perpendicular thereto, the suctioned fluid is conducted to the sensor device 3. Thus here, as in the other embodiments, no impoundment is present (such as e.g. in a Pitot tube or in a device for stagnation temperature measurement) in the interior of the measuring device 10. In FIG. 4A, the distance B of the suction intake opening 1 from the wall 5 is shown.

Figure 5A:
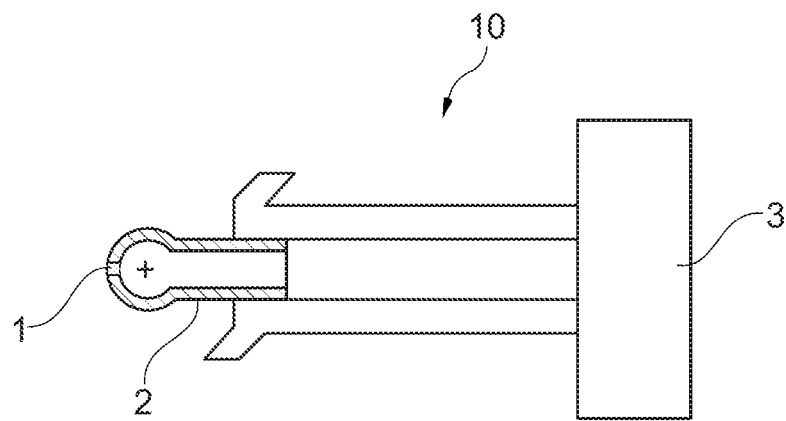
FIG. 5A shows a sectional view of a further embodiment of the measuring device.
Figure 5B:
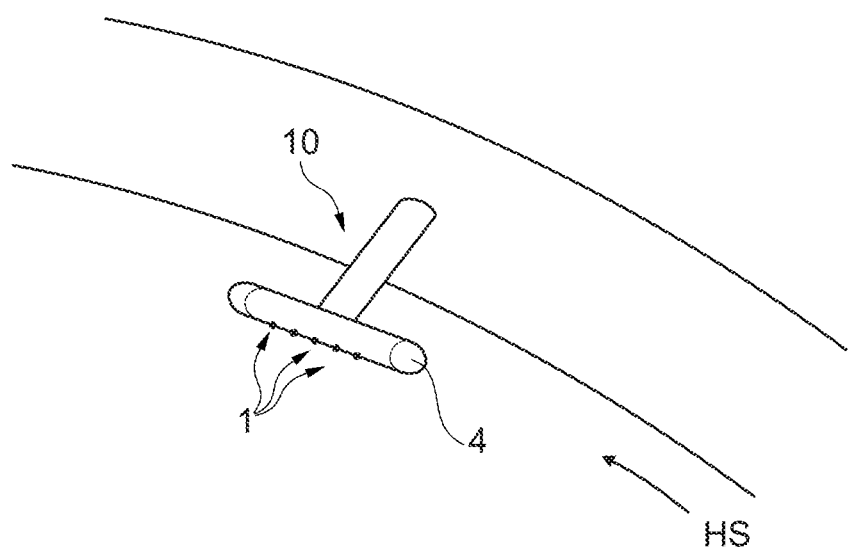
FIG. 5B shows a perspective rendering of the embodiment according to FIG. 5A.
Figure 5C:
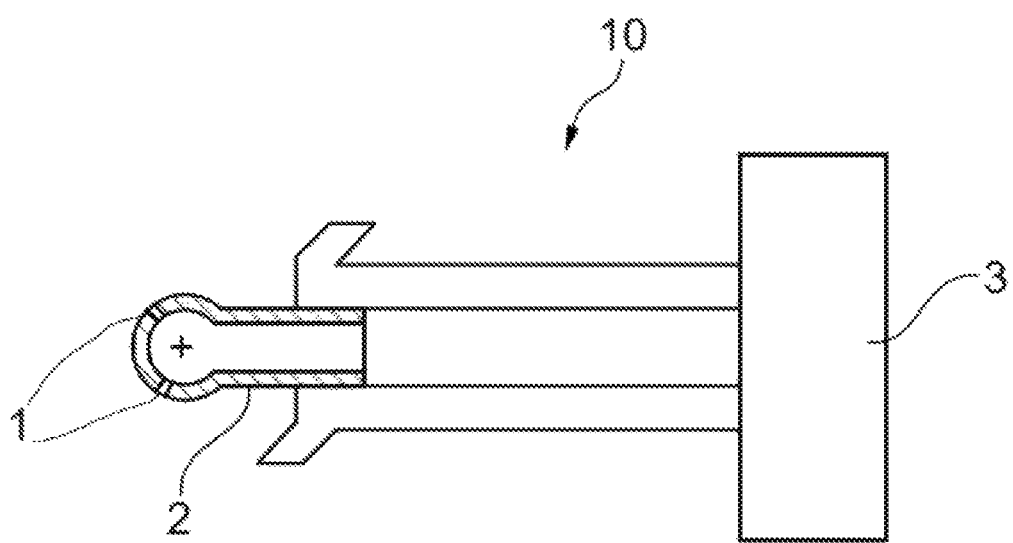
FIG. 5C shows a sectional view of a further embodiment of the measuring device.

In the embodiment according to FIGS. 5A, B, not only one suction intake opening 1 but a plurality of suction intake openings 1 (FIG. 5C, wherein the two suction intake openings 1 are arranged at a distance between one another of between 90° and 120°) arranged at the circumference of a substantially circular cylindrical flow body is used. The flow body, which comprises a part of the fluid channel 2 in the interior, is positioned substantially in parallel with respect to the main flow direction HS. The end 4, that [ . . . ] in the main flow direction HS is optimized with respect to fluid mechanics, i.e. it has a flow resistance that is as low as possible.

In the embodiment that is shown herein, the suction intake openings 1 are arranged in a linear manner on the outer side of the circular cylindrical flow body. In an alternative embodiment, the suction intake openings 1 are arranged radially at the circumference. Here, the suction intake openings can be arranged so as to have an angular offset with respect to one other.

The fluid channels shown so far were formed so as to be linear (e.g. FIG. 1) or linear in certain sections (e.g. FIGS. 3A, 3B).

In principle, it is also possible that the fluid channels 2 are embodied so as to be at least partially curved. Also, the fluid channel 2 can have a different shape on the outside than the fluid-conducting part on the inside.

Figure 6:
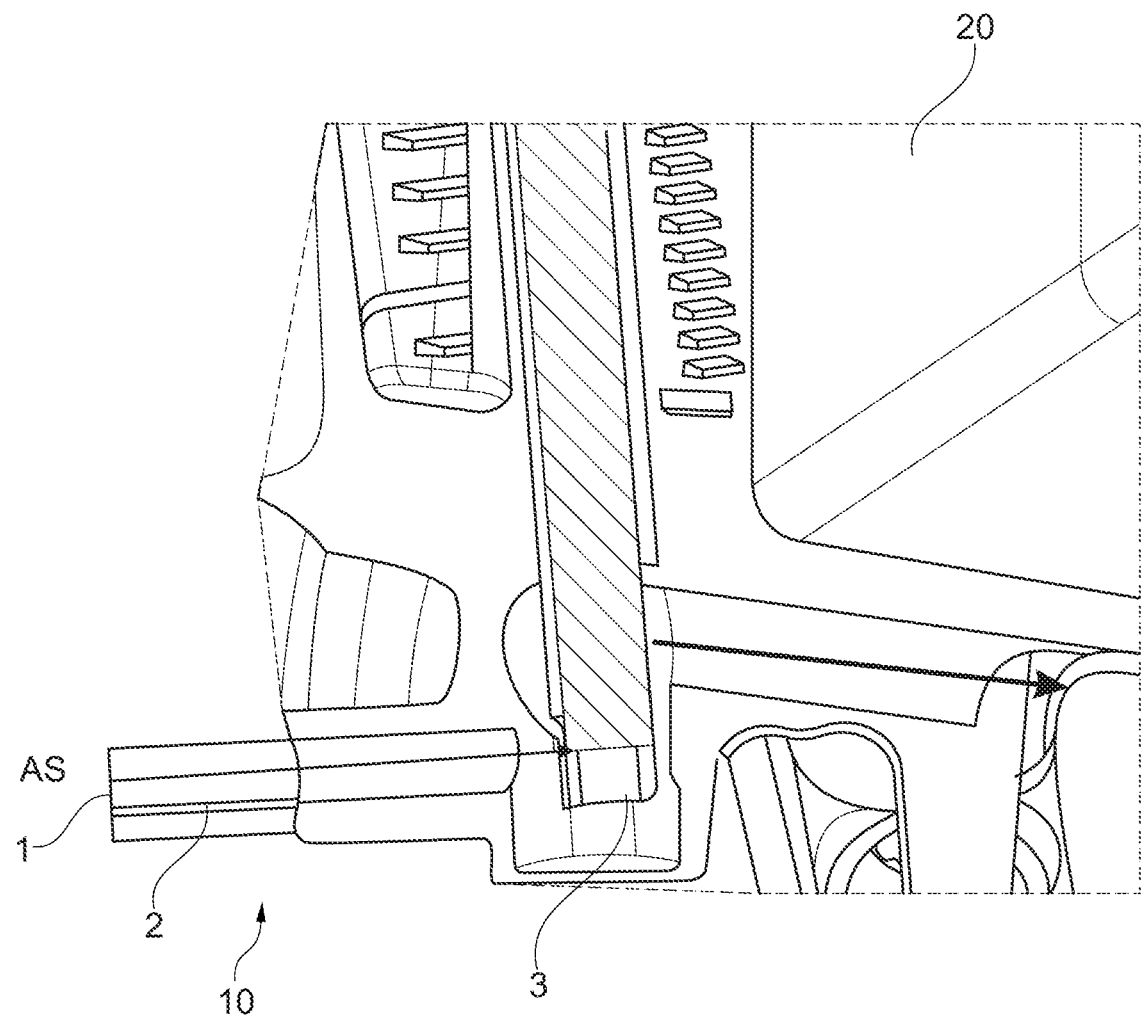
FIG. 6 shows a perspective arrangement of an embodiment in the area of a guide vane.

FIG. 6 shows a section from the area of a guide vane 20. The fluid channel 2 projects with a suction intake opening 1 into the mixed-out flow AS. The temperature sensor device 3 is arranged in the interior. A pressure ratio of between 1.2 and 1.5, in particular 1.4, is present between the mixed-out flow AS and the sensor device.

PARTS LIST

1 suction intake opening of the measuring device
2 fluid channel of the measuring device
3 sensor device
4 tip of the measuring device optimized with respect to fluid mechanics
5 wall of the flow
10 measuring device
20 guide vane (stator)
21 rotor blade (rotor)
AS mixed-out flow
GS boundary layer flow
HS main flow direction
B distance of the suction intake opening from the wall
F suctioned-in fluid

The invention claimed is:

1. A turbomachine comprising:
   a guide vane;
   a rotor blade; and
   a measuring device comprising:
      at least one suction intake opening for suctioning a fluid from an area of a mixed-out flow, wherein the at least one suction intake opening is arranged at a distance from a wall that delimits a path of the mixed-out flow;
      a sensor, wherein the sensor is at least one chosen from a temperature sensor, a sensor for measuring a concentration of at least one substance, a sensor for determining a particle size of a flow containing particles, a sensor for determining an air humidity, and a sensor for determining an oil content in a gas;
      a fluid channel between the at least one suction intake opening and the sensor, wherein the fluid suctioned at the at least one suction intake opening flows through the fluid channel to the sensor, wherein the fluid channel is configured such that the fluid suctioned at the at least one suction intake opening flows in an impoundment-free manner, and wherein the fluid channel completely separates the sensor from the path of the mixed-out flow;
   wherein the measuring device is arranged between the guide vane and the rotor blade.

2. The turbomachine according to claim 1, wherein the at least one suction intake opening is arranged at the fluid channel and wherein the fluid channel is straight or curved at least in certain areas.

3. The turbomachine according to claim 1, wherein a cross section of the at least one suction intake opening is round or elliptical.

4. The turbomachine according to claim 1, wherein the at least one suction intake opening is arranged at a circumference of the fluid channel.

5. The turbomachine according to claim 4, wherein the at least one suction intake opening includes two suction intake openings arranged at a distance between one another of between 90° and 120° at the circumference of the fluid channel.

6. The turbomachine according to claim 1, wherein the fluid channel includes a free length, wherein the free length is a portion of the fluid channel from the at least one suction intake opening to the wall that delimits the path of the mixed-out flow, and wherein a ratio of the free length and a diameter of the fluid channel is between 0.5 and 1.5.

7. The turbomachine according to claim 6, wherein the ratio of the free length and the diameter of the fluid channel is 1.

8. The turbomachine according to claim 1, wherein the fluid channel includes a free length, wherein the free length is a portion of the fluid channel from the at least one suction intake opening to the wall that delimits the path of the mixed-out flow, and the free length corresponds to 2 to 10 times a boundary layer thickness as it is formed during operation.

9. The turbomachine according to claim 1, wherein the at least one suction intake opening is arranged parallel to a main flow direction.

10. The turbomachine according to claim 1, wherein the at least one suction intake opening is arranged at an angle of between 70° and 110° to a main flow direction.

11. The turbomachine according to claim 10, wherein the at least one suction intake opening is arranged at an angle of between 85° and 105° to the main flow direction.

12. The turbomachine according to claim 11, wherein the at least one suction intake opening is arranged at an angle of 90° to the main flow direction.

13. The turbomachine according to claim 1, wherein during operation, a pressure ratio between the mixed-out flow and the sensor is between 1.2 and 1.5.

14. The turbomachine according to claim 13, wherein during operation, the pressure ratio between the mixed-out flow and the sensor is 1.4.

15. The turbomachine according to claim 1, wherein the at least one measuring device is arranged in at least one chosen from an air conduction system and a hot gas path of a compressor or a turbine.

16. A measuring method, comprising:
   providing:
      a turbomachine comprising:
         a guide vane;
         a rotor blade; and
         a measuring device comprising:
            at least one suction intake opening for suctioning a fluid from an area of a mixed-out flow, wherein the at least one suction intake opening is arranged at a distance from a wall that delimits a path of the mixed-out flow;
            a sensor, wherein the sensor is at least one chosen from a temperature sensor, a sensor for measuring a concentration of at least one substance, a sensor for determining a particle size of a flow containing particles, a sensor for determining an air humidity, and a sensor for determining an oil content in a gas;
            a fluid channel between the at least one suction intake opening and the sensor, wherein the fluid channel completely separates the sensor from the path of the mixed-out flow;

wherein the measuring device is arranged between the guide vane and the rotor blade;

suctioning a fluid in from an area of the mixed-out flow at the at least one suction intake opening; and conducting the fluid suctioned through the fluid channel to the sensor wherein the fluid channel is configured such that the fluid suctioned at the at least one suction intake opening flows in an impoundment-free manner.

17. A turbomachine comprising:

a guide vane;

a rotor blade; and a measuring device comprising:

at least one suction intake opening for suctioning a fluid from an area of a mixed-out flow, wherein the at least one suction intake opening is arranged at a distance from a wall that delimits a path of the mixed-out flow;

a sensor;

a fluid channel between the at least one suction intake opening and the sensor, wherein the fluid channel includes a free length, and wherein the free length is a portion of the fluid channel from the at least one suction intake opening to the wall that delimits the path of the mixed-out flow;

wherein the fluid suctioned at the at least one suction intake opening flows through the fluid channel to the sensor, wherein the fluid channel is configured such that the fluid suctioned at the at least one suction intake opening flows in an impoundment-free manner, and wherein a ratio of the free length and a diameter of the fluid channel is between 0.5 and 1.5;

wherein the measuring device is arranged between the guide vane and the rotor blade.

18. The turbomachine according to claim 17, wherein the ratio of the free length and the diameter of the fluid channel is 1.

* * * * *